United States Patent [19]
Wheeler et al.

[11] Patent Number: 5,171,419
[45] Date of Patent: Dec. 15, 1992

[54] METAL-COATED FIBER COMPOSITIONS CONTAINING ALLOY BARRIER LAYER

[75] Inventors: Nea S. Wheeler, Germantown; David S. Lashmore, Frederick, both of Md.

[73] Assignee: American Cyanamid Company, Stamford, Conn.

[21] Appl. No.: 466,800

[22] Filed: Jan. 18, 1990

[51] Int. Cl.$^5$ .......................... C25D 5/10; C25D 5/12
[52] U.S. Cl. .................................... 205/176; 205/181; 205/238; 205/255
[58] Field of Search ................. 204/28, 38.1, 40, 44.5; 205/160, 161, 176, 181, 224, 238, 255, 150

[56] References Cited

U.S. PATENT DOCUMENTS

| | | | |
|---|---|---|---|
| 3,802,854 | 4/1974 | Mueller-Dittmann et al. | 204/44.5 |
| 4,525,248 | 6/1985 | Landa et al. | 204/44.5 |
| 4,609,449 | 9/1986 | Morin | 204/206 |

OTHER PUBLICATIONS

Chemical Abstract 82:117765n Yagubets et al.

Primary Examiner—John Niebling
Assistant Examiner—Brian M. Bolam
Attorney, Agent, or Firm—Frank M. Van Riet

[57] ABSTRACT

The present invention disclosed metal-coated fibers and metal matrix composites made therefrom comprising metal-coated carbon or graphite fiber which have a layer of CoW or NiW alloy interposed between the fiber and its outer metal layer.

16 Claims, 1 Drawing Sheet

METAL-COATED FIBER COMPOSITIONS CONTAINING ALLOY BARRIER LAYER

The invention described herein was made in the performance of work supported by the National Institute of Standard and Technology.

FIELD OF THE INVENTION

The present invention is directed to metal-coated fibers having a protective alloy barrier deposited thereon. In particular, the present invention is directed to metal-coated fibers and articles made therefrom comprising metal-coated graphite or carbon fibers having a layer of CoW or NiW electrodeposited thereon between said fiber and said metal coating.

BACKGROUND OF THE INVENTION

Carbon and graphite fibers are desirable for use in metal-matrix composites because of their high-temperature strength, high elastic modulus, and low density. Yet their use in certain matrices, such as those containing nickel, is limited by the degradation of their mechanical properties.

In the fiber interface of a nickel-containing matrix, for example, exposure of the composite to temperatures in excess of 600° C. for extended periods of time significantly reduces the tensile strength of the graphite fibers contained therein. The two mechanisms primarily responsible for the reduction of mechanical properties are reported to be: (1) decrease of fiber diameter due to diffusion of carbon from the fiber into the nickel matrix (as reported by Barclay R. B., *J. Mater. Sci.* 1971, 6, 1076–1083 and (2) nickel-catalyzed regraphitization of the fiber (as reported by Jackson, P. W. and Marjoram, J. R., *Nature* 1968, 218, 83–84). If the material is thermally cycled, the mismatch of thermal coefficients of expansion of the fiber and matrix material is also responsible for reduction in tensile strength. (as reported in U.S. Pat. No. 3,796,587)

Under constant thermal conditions, however, a diffusion barrier to suppress the interdiffusion of nickel and carbon has been reported to protect the mechanical properties of nickel-graphite matrices. Several such barriers have been proven to be beneficial, most notably those containing carbide-forming metals. Carbide-containing barrier coatings have been produced by a variety of methods, such as: by chemical vapor deposition (CVD) (Aggour, L., *Carbon* 1974, 12, 358–362); by soaking the fibers in a melt containing a carbide forming metal and an acid soluble metal, followed by an acid bath to remove the unreacted metal (U.S. Pat. No. 3,796,587); by precoating the fiber in a melt containing a refractory powder suspended in a low-melting-point metal [Rashid, 1974]; and by electrodeposition of a thin layer of nickel followed by another thinner layer of a carbide-forming metal (U.S. Pat. No. 3,807,996). The last two methods required the subsequent heating of the coated fibers to allow diffusion of the reactive metal to the graphite surface where a carbide interfacial zone was formed and therefore involves undesirable processing steps. Yagubets and Sherstkina (*Elektron, Obrab, Mater,* 1974, 5, 31–33, CA 82:117765n) electrodeposited, plastic cobalt-tungsten and nickel-tungsten coatings on graphite fibers from an aqueous bath.

SUMMARY OF THE INVENTION

The present invention is directed to metal-coated fibers and metal matrix composites comprising carbon or graphite fibers, said fibers having electrodeposited thereon a continuous coating of CoW or NiW.

The present invention is further directed to the production of such fibers and metal matrix composites.

DETAILED DESCRIPTION OF THE INVENTION

Figure 1:
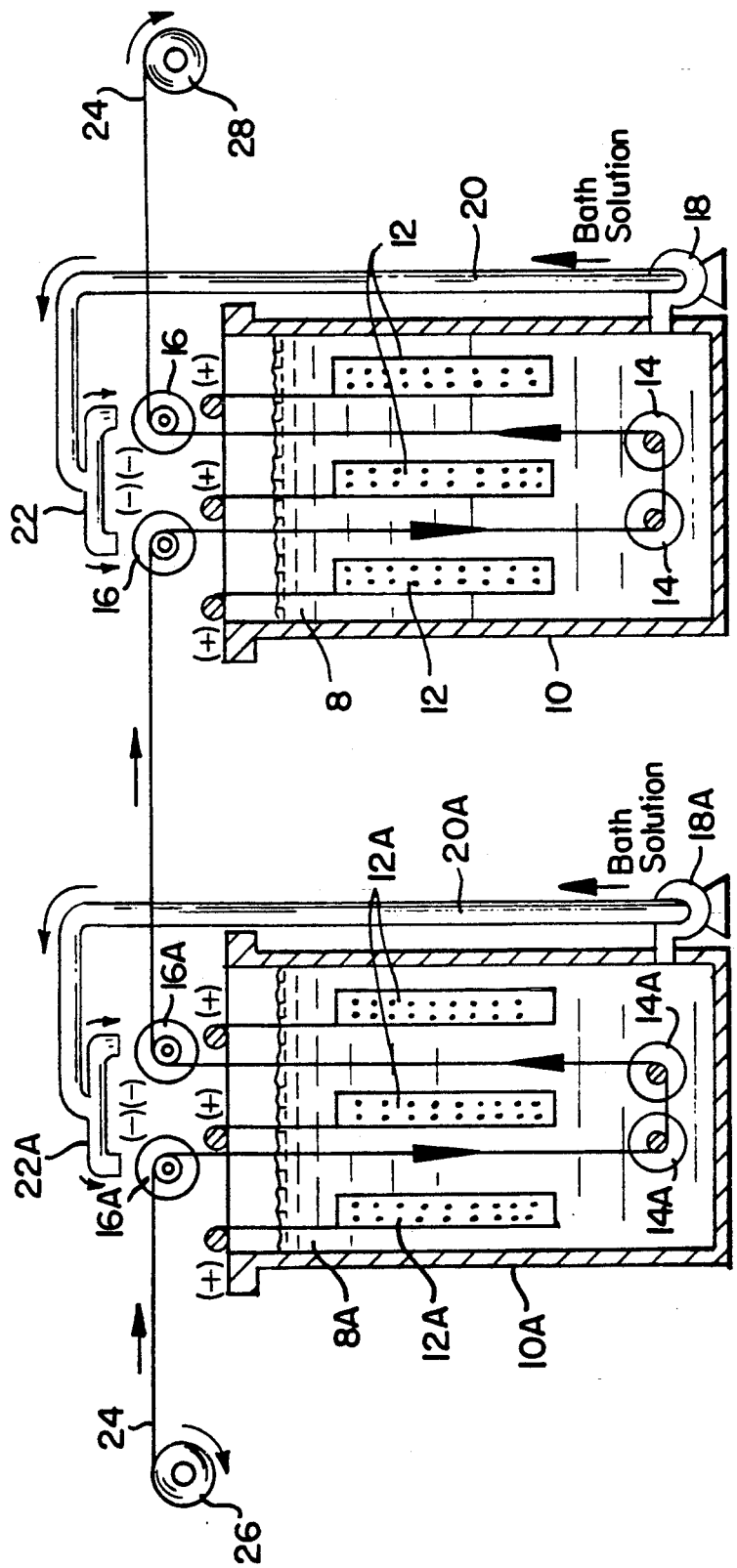
FIG. 1 is a schematic representation of the apparatus which may be used to produce the fibers claimed herein.

The core fibers used in the production of the claimed fibers of this invention include carbon, graphite and mixtures of such fibers. The choice of fiber will depend on the nature of the application envisioned for the coated fiber. Structural carbon fibers, such as those produced from polyacrylonitrile (PAN), having moduli in the range of 30 to $50 \times 10^6$ pound per square inch (psi), would be selected for applications where moderate strain to failure in the composite were needed. Graphite fibers such as those produced from pitch that have moduli from 55 to $146 \times 10^6$ psi might be used where very high thermal or electrical conductivity or very low thermal expansion were required.

If a batch process is to be used, it is convenient to use long cut sections of fiber tow (e.g. about 40 inches in length) tow and a glass weight placed halfway along the tow. The tow is then lowered into suitable vessels, e.g., 1 liter graduate cylinders containing the various baths described hereinafter, to provide that the weight rests on the bottom of the cylinder. In this way the fibers in the tows remain aligned.

If a continuous process is to be used for the production of the claimed fibers, it may be convenient to operate in the fashion described in U.S. Pat. No. 4,609,449 which will hereinafter be described in reference to FIG. 1.

Electrolytic bath solution 8A is maintained in tank 10A. Also included are cathode baskets 12A and idler rolls 14A near the bottom of tank 10A. Two electrical contact roller 16A are located above the tank. Tow 24 is pulled by means not shown off feed roll 26, over first contact roller 16A down into the bath under idler rollers 14A, up through the bath and over second contact roller 16A. By way of illustration, the immersed tow length may be about 6 feet. Optional, but very much preferred, is a simple recycle loop comprising pump 18A, conduit 20A, and feed head 22A. This permits recirculating the electroplating solution at a large flow rate, e.g. 2–3 gallons/min. and pumping it onto contact rollers 16A. Discharged just above the rollers, the sections of tow 24 and leaving the plating solution are totally bathed, thus cooling them. At the high current carried by the tow, in $I^2R$ heat generated in some cases might destroy them before it reaches or after it leaves the bath surface without such cooling. The flow of the electrolyte overcomes anisotropy. Of course, more than one plating bath to effect electrodeposition of the alloy can be used in series.

Various electroplating baths may be used to effect electrodeposition of the CoW or NiW on the fibers. Such solutions and processes using said solutions are disclosed in *Modern Electroplating,* Third Edition, Wiley - Interscience, New York, John Wiley & Sons, 1974. For example a solution for use in bath 10A contains:

| | |
|---|---|
| cobalt sulfate and/or cobalt chloride | (25-200 g/l) |
| sodium tungstate | (5-100 g/l) |
| citric acid or sodium potassium tartrate | (5-100 g/l) |

Optionally, the above solution may contain a wetting agent, such as sodium lauryl sulfate, and/or from 25-100 g/s of ammonium chloride. A preferred solution for bath 10A contains:

| | |
|---|---|
| cobalt sulfate | (50-75 g/l) |
| sodium tungstate | (15-25 g/l) |
| citric cid | (60-79 g/l) |
| pH adjuted to 4.0 with sodium hydroxide | |

The current density employed in the electrodeposition of the CoW or NiW alloy is generally maintained in the range of 15-120mA/cm$^2$, preferably between 30-60 mA/cm$^2$ and most preferably about 30mA/cm$^2$. The speed of tow 25 is maintained in the range of 0.1-25 ft/min, preferably 0.5-10ft/min and most preferably from 2-5ft/min. The voltage employed to maintain the desired current density range from about 5-30 volts.

The electrodeposition of the tungsten-containing alloy is maintained such that an alloy thickness is deposited which is sufficient to protect the fiber from the elevated-temperature degradation seen with uncoated fibers. This thickness generally varies from the minimum thickness which is detectable by scanning electron microscopy to about 0.3 microns. Expressed in another manner, this thickness can range from less than about 0.1 microns to about 0.3 microns. Preferably, the thickness of the alloy is no greater than 0.1 um. Most preferably, the thickness of the alloy is about 0.1 microns.

Electrolytic bath solution 8 useful in the electrodeposition of the outer metal coating on the alloy-coated fiber is maintained in tank 10A. Also included are anode/baskets 12 and idler roller 14A near the bottom of tank 10A. Two electrical contact roller 16A are located above the tank. Tow 24 is pulled by means not shown off feed roller 26 over contact roller 16A down into the bath under idler rolls 14A, up through the bath, over second contact roller 16A and into bath 10 by way of contact roller 16. Optional, but very much preferred, is a simple recycle loop comprising pump 18A, conduit 20A, and feed head 22A. This also permits recirculating the plating solution at a large flow rate, e.g. 2-3 gallons/min. and pumping it onto contact rolls 16A. Discharged just above the rolls, the sections of tow 24 and leaving the plating solution are totally bathed, thus cooling them. If high currents are carried by the tow, the I$^2$R heat generated in some cases might destroy them before they reach or after they leave the bath surface without such cooling. The flow of the electrolyte overcomes anisotropy. A serial array of more than bath can also be used.

Solutions and process conditions useful in the electrodeposition of the outer metallic layer on the alloy-coated fiber are well known in the electroplating art. Reference is again made to *Modern Electroplating*, supra. and U.S. Pat. No. 4,609,449, the contents of both sources being hereby incorporated by reference.

The metals useful in the outer layer of the claimed fibers may be any metal which may be electrodeposited. Its identity is therefore not critical. Among those metals useful in this regard include copper, aluminum, lead, zinc, silver, gold, magnesium, tin, titanium, iron, nickel, or a mixture of any of the foregoing. Preferred are nickel and copper.

The electrodeposition of the outer metallic layer is maintained for a time sufficient to produce a coating thickness sufficient for the intended application of the metal-coated fiber product. For instance, if the fiber is to be incorporated into a metal matrix composite, the thickness of the outer metallic layer may vary from about 0.1 to about 5.0 microns. Preferably, said layer has a thickness of about 0.2 to about 3.0 microns. Most preferably, the thickness ranges from about 1.5 to about 3.0 microns. However, if the fiber is to be used in electrical applications such as in providing electromagnetic shielding properties to molded articles, the thickness of the outer metallic layer on the fibers should range only from about 0.1 to about 0.3 microns.

Filtration of the solution within the baths is preferably performed by in-line filters and is very desirable to keep all solutions free of an accumulation of broken fibers.

The fiber is also preferably passed through an optional rinse station, desirable to remove any excess electroplating solution "drag-through" which can influence the chemistry of succeeding baths. A suitable rinse station consists of a table over which the fiber runs, and a water spray directed downward onto this table. The force of the water spray and subsequent run-off the edges of the "table" help to spread the fiber.

It should be understood that the plating line may have multiple tanks for each type of electroplating, and different current densities may be used therein. For example, a low current may be used in the first tank of each plating type to minimize the risk of fiber burnout. The remaining tanks can be operated at higher currents to facilitate more rapid plating in any of this remaining tanks. Solution agitation, such as by pumping from a reservoir, and oscillation resulting from the use a fiber spreading device may be employed to permit the current to be increased without evidence of hydrogen evolution, a symptom of overvoltages in plating operations, demonstrating that such agitation results in more efficient plating.

After the fiber has been electroplated with the outer metallic layer plated to a sufficient extent, the fiber optionally but preferably is rinsed as described above and then dried, such as through the use of an air knife, heat gun or rotary drum drier. Preferably, a heat gun is attached to a heating chamber (not shown). The fiber is then spooled, either onto a spool with other tows or preferably individually into separate spools by a fiber winder (e.g., graphite fiber winders made by Leesona Corp., South Carolina) (not shown).

As shown in the Examples contained herein, the alloy-coated fibers of the present invention markedly decrease temperature-induced deterioration of carbon and graphite fibers within a metal matrix. While not wishing to be bound by any theories presented herein, Applicants believe that such alloys present a barrier which presents interdiffusion of the fiber and matrix materials. This barrier is further believed to comprise a carbide composition of the alloy and fiber since preliminary x-ray diffraction studies have shown Co$_3$W$_3$C and $Co_6W_6C$ to be present at the interface of fibers coated with CoW alloy.

In a further embodiment of the present invention, a variety of types of composites of the invention can be produced using the fibers produced previously described. Methods for incorporating such fibers into polymeric and metallic matrices are contemplated. The methods include directly consolidating the metal coated fiber of this invention so that the coating becomes the matrix. Simply by hot pressing, for example, between 600° C. and 900° C., most preferably between 725° C. and 750° C., in a reducing atmosphere or a vacuum the fibers of this invention can be consolidated to form substantially void-free, uniform composites.

The fibers of this invention can be fabricated into composites by direct consolidation also by "laying up" the fibers. To do so, the fibers are aligned into single layer tow, which optionally may be held together by a fugitive binder or merely the capillary action of water. These layers are then stacked by either keeping the layers aligned in parallel or by changing the angle between adjacent layers to obtain a "cross-plied" laminate. Since the physical properties of the composite and fiber are anisotropic, a range of properties can be achieved by changing the orientation of the various layers of the composite.

Because the coated fibers of this invention have few agglomerations, it is possible to spread the fiber into very thin plies, as low as 3 mils. Thin plies are an advantage when large area structures are to be built, such as radiator structures. In such an application, the composite should be as thin as possible, yet to obtain sufficient stiffness in all directions, several layers, having several orientations, are required. Therefore, the thinner each ply is, the thinner the final, multi-layered composite can be. By making thinner structures, substantial weight savings can be effected which is crucial in any aerospace or transportation application.

Composites produced by direct consolidation of the fibers of this invention have the advantage that the metal remains in intimate contact with the fibers during hot pressing. This is possible because the carbon fibers are coated with metal by the plating process and are consolidated at relatively low temperatures (e.g, 750° C.) This assures that dewetting does not occur during consolidation of the fibers into the composite. The composites of this invention also have the advantage that they have a very uniform distribution of the base fiber throughout the thickness without undesirable matrix-rich regions. In addition, the void content of the composites is low because of the uniformity of coating and low agglomeration rate of the starting coated fiber. Also, the purity of the metal matrix can be very high. The very low agglomeration of the fibers of this invention makes possible thin metal matrix composites, filament wound composites, braided composites and woven composites. The composites of this invention have good mechanical properties due to their uniformity, and good thermal and electrical properties due to the purity of the copper component of the composite.

The organic polymeric materials for use as matrices in the composites of the invention are numerous and generally any known polymeric material may find application. By way of illustration, some of the known polymeric materials useful in the invention include: polyesters, polyethers, polycarbonates, epoxies, phenolics, epoxy-novolacs, epoxy-polyurethanes, ureatype resins, phenol-formaldehyde resins, melamine resins, melamine thiourea resins, urea-aldehyde resins, alkyd resins, polysulfide resins, vinyl organic prepolymers, multifunctional vinyl ethers, cyclic ethers, cyclic esters, polycarbonate-coesters, polycarbonate-co-silicones, polyetheresters, polyimides, bismalemides, polyamides, polyetherimides, polyamide-imides, polyetherimides, and polyvinyl chlorides. The polymeric material may be present alone or in combination with copolymers, and compatible polymeric blends may also be used. In short, any conventional polymeric material may be selected and the particular polymer chosen is generally not critical to the invention. The polymeric material should, when combined with the composite fibers, be convertible by heat or light, alone or in combination with catalysts, accelerators, cross-linking agents, etc., to form the components of the invention.

The fibers of the present invention are well-suited for incorporation with polymeric materials to provide electrically conductive components. The composite fibers have a very high aspect ratio, i.e., length to diameter ratio, so that intimate contact between the fibers to provide conductive pathways through the polymer matrix is achieved at relatively low loading levels of fibers, and more particularly at much lower levels than the metal-coated spheres and metal flakes utilized in prior art attempts to provide electrically conductive polymer compositions. This ability to provide electrical, and/or thermal conductivity at low concentrations of fiber, significantly reduces any undesirable degradation or modification of the physical properties of the polymer.

The metal coated fibers may be present in the composites as single strands, or bundles of fibers or yarn. The fibers or bundles may be woven into fabrics or sheets. In addition, the fibers, or bundles may be comminuted and dispersed within the polymeric material, may be made into nonwoven mats and the like, all in accordance with conventional techniques well-known to those skilled in this art.

The composites of the invention are convertible to many components. In one embodiment of the invention, a composite is prepared by immersing and wetting a nonwoven mat of the composite fibers, such as into a polymeric resin solution, such as one formed by dissolving an epoxy resin or a phenolic resin in an alcohol solvent. Other forms such as unidirectional fibers, woven fabrics, braided fabrics and knitted fabrics can be used, too. This composition may then be converted to an electrically conductive component in the form of a resin impregnated prepreg useful for forming electrically conductive laminates. More particularly, the polymer resin solution wetted mat may be heated to drive off the alcohol solvent. When the solvent removal is complete, a component is formed comprising a layer of randomly oriented and over-lapping composite fibers or bundles of fibers having a polymeric resin layer, and in this case epoxy or phenolic resin layer, coating said fibers and filling any voids or interstices within the mat. The resin impregnated prepreg so formed may be cut to standard dimensions, and several of the prepregs may be aligned one on top of the other, to form a conventional lay up. The lay up is then heated under pressure in a conventional laminating machine which causes the polymer resin to flow and then cure, thereby fusing the layers of the lay up together to form a hardened, unified laminate. The impregnating, drying, lay up, and bonding steps for preparing these laminates are conventional and well-known in the art. Further references as to materials, handling and processing may be had from the *Encyclopedia of Polymer Science and Technology*, Volume 8, pages 121-162, Interscience, New York, 1969.

The laminates prepared in accordance with the invention may be cut, molded, or otherwise shaped to form many useful articles. For example, the laminate could be made to form a structural base or housing for an electrical part or device, such as a motor, and because the housing is electrically conductive, effectively ground the device.

In an alternate embodiment, the composition of the invention comprises a thin, normally non-conductive polymer film or sheet and a woven, nonwoven unidirectional sheet, etc., formed of the composite fiber. The polymeric film or sheet may be formed by conventional film forming methods such as by extruding the polymer into the nip formed between the heated rolls of a calendar machine, or by dissolving the polymeric material in a suitable solvent, thereafter coating the polymer solution onto a release sheet, such as a release kraft paper with for example a "knife over roll" coater, and heating to remove the solvent. The polymer film or sheet is then heated to between 100° and 200° F. and laminated with the nonwoven mat of composite fibers by passing the two layers between the heated nip of a calendar. The resulting component in the form of a fused polymer film supported with a conductive mat is useful, for example, as a surface ply for laminates.

Air foil structures made with such laminated composites provide an effective lightning strike dissipation system for aircraft. In the past, if lightning struck an aircraft, the non-metallic parts would be subject to significant damage because of their non-conductive nature. With such a laminate forming the outer surface of air foil, should lightning strike the aircraft, the resulting current will be conducted and dissipated through the conductive fiber mat and conductive base laminate, thereby reducing the risk and occurrence of damage to the airfoil.

The present invention is illustrated through the Examples which follow. These Examples should not, however, be construed as representing a limitation on the scope of the present invention or the claims appended hereto.

EXAMPLE 1

A nickel/graphite sample was prepared through the electrodeposition of a relatively heavy coating of nickel onto tows of polyacrylonitrile (PAN) fibers, which are marketed by Hercules under the designation AS4-3K. Application of this heavy electrodeposited coating allowed the simulation of a metal matrix composite. The electrodeposition was accomplished through the use of a plating bath of the following composition:

450 ml of 3.07 M concentrate Ni sulfamate
30 g/l of Boric Acid
0.5 g/l of Sodium Laurel Sulfate The bath was found to have a pH of 4.0. Electrodeposition was conducted at a bath temperature of 50° C. and through the application of $-1.1$ V (vs SCE).

The resulting samples were then cut into 5–7 sections, each about one (1) centimeter in length. The samples were then sequentially degreased in acetone, hexane, methanol, hexane, and acetone followed by ultrasonic degreasing in ethanol. The samples were then individually encapsulated in quartz ampules under a vacuum of $10^{-5}$ Pa. The samples (with the exception of a control) were then heat treated. Only samples obtained from a single electrodeposition were used in any given test. Different batches were not mixed, and one sample from each batch was left unannealed for comparison purposes Annealing of a single batch (4–6 samples) was done at one time, with all samples being placed in the furnace at once. Samples were removed individually at the end of a specified time interval, which ranged from 9.2 minutes to 168 hours. After heat treatment, the samples were ground on silicon carbide paper through 2400 grit and polished with diamond paste through 0.25 um.

Measurement of fiber diameter and observation of the fibers were then performed using a JEOL JXA-840 electron probe x-ray microanalyzer and a Tracor-Northern image analyzer Typically, 5-10 fibers were used to determine the average fiber diameter of a sample. A total of 32 measurements were made on each fiber. The averages for all the fibers were then averaged to give the average diameter for the entire group of fibers.

The average diameter of the control sample of fibers were found to be about 7.01. This figure, as well as those for fibers following the application of elevated temperatures is set forth below in Table I.

TABLE I

| Sample | Annealing Treatment | Average Diameter (μm) | # of Fiber Measured |
|---|---|---|---|
| Control | None | 7.01 ± 0.27 | 13 |
| 1 | 1100° C., 24 hr | 0.75 ± 0.31 | 3 |
| 2 | 800° C., 24 hr | 6.36 ± 0.28 | 6 |
| 3 | 600° C., 24 hr | 6.78 ± 0.15 | 8 |

It is apparent that annealing at from 600°–1100° altered the fiber morphology with the severity of the alteration varying directly with annealing temperature. At both 600° C. and 800° C., analysis with the scanning electron microscope did not reveal any morphological changes in the fibers while in Sample 2, nickel was shown to have entered the fiber itself.

EXAMPLE 2

In procedure of Example 1 was followed except that a layer of cobalt tungsten alloy (CoW) was electrodeposited on the PAN fibers prior to their receiving the nickel coating.

Electrodeposition was accomplished through the use of a bath having the following composition:

0.23 m/l (64.5 g/l) $CoSO_4 7H_2O$
0.057 m/l (66.0 g/l) $Na_2WO_4$-$2H_2O$
0.31 m/l (18.8 g/l) Citric Acid
pH 4 (adjusted with $NH_4OH$).

Pre-electrolysis of the solution was conducted at 1 m $A/cm_2$ for 48 hours to ensure purity of the solution. Electrodeposition of the CoW alloy was then conducted at about 22° C. and an applied current of 30 $A/cm_2$. The resulting fibers had a tungsten content of about 24–27 wt. %.

The average diameters of the fibers within the sample so produced is set forth in Table II below.

TABLE II

| Samples | Annealing Treatment | Average Diameter (μm) | # of Fiber Measured |
|---|---|---|---|
| 4 | 1100° C., 24 hr | 3.79 ± 0.86 | 21 |
| 5 | 800° C., 24 hr | 6.77 ± 0.17 | 5 |
| 6 | 800° C., 49 hr | 6.25 ± 0.39 | 4 |
| 7 | 800° C., 168 hr | 6.24 ± 0.21 | 8 |

Through comparison with Samples 1-3, it can be seen that the alloy coating protected the fibers even after annealing at 800° C. for 24 hours.

EXAMPLE 3

The procedure of Example 2 was followed except that electrodeposition of the CoW alloy was conducted such that the resulting fibers were coated with a thinner layer of alloy (<0.5 wt. % W).

The average diameter of the fibers within the sample so produced is set forth in Table III below.

TABLE III

| Sample | Annealing Treatment | Average Diameter (μm) | # of Fibers Measured |
| --- | --- | --- | --- |
| 8 | 800° C., 25 hr | 6.65 ± 0.04 | 2 |

Fiber damage was observed after annealing at 800° C. for 24 hr, but the damage was not nearly as severe as for the fibers in the nickel matrix with no intervening CoW layer.

We claim:

1. A process for the production of yarns or tows of composite fibers, said process comprising:
   (a) providing a continuous length of a plurality of semimetallic fibers,
   (b) immersing at least a portion of the length of said fibers in a bath capable of electrolytically depositing on said fiber an alloy selected from the group consisting of CoW and NiW,
   (c) applying an external voltage between the core fibers and the bath sufficient to deposit said alloy on said fibers and maintaining said voltage for a time sufficient to produce a firmly adherent layer of said alloy on said fibers,
   (d) immersing at least a portion of the length of said fibers to which said alloy is adhered in a bath capable of electrolytically depositing a metal on said fibers and
   (e) applying an external voltage between the fibers and the bath sufficient to deposit said metal on said fibers and maintaining said voltage for a time sufficient to produce an outer layer of said metal on said fibers.

2. The process of claim 1 wherein said fibers comprise carbon, graphite or a combination thereof.

3. The process of claim 2 wherein said fibers comprise carbon.

4. The process of 2 wherein said alloy is CoW.

5. The process of claim 1 wherein said metal is selected from the group consisting of copper, aluminum, lead, zinc, silver, gold, magnesium, tin, titanium, iron and nickel.

6. The process of claim 1 carried out continuously.

7. The process of claim 1 wherein the thickness of the alloy layer is less than or equal to about 0.3 microns.

8. The process of claim 7 wherein the thickness of the alloy layer is less than or equal to about 0.1 microns.

9. The process of claim 8 wherein the thickness o the alloy layer ranges is about 0 1 microns.

10. A process as defined in claim 2 wherein the thickness of said outer metal layer on said fibers ranges from about 0.1 to about 5.0 microns.

11. A process as defined in claim 10 wherein the thickness of said outer metal layer ranges from about 0.2 about 3.0 microns.

12. A process as defined in claim 11 wherein the thickness of said outer metal layer ranges from about to about 3.0 microns.

13. A process as defined in claim 1 including the step of weaving, braiding or knitting yarns produced by the process alone, or in combination with yarns of a different material, into a fabric.

14. A process as defined in claim 1 including the step of laying up the yarns produced by the process alone, or in combination with yarns or a different material into a non-woven sheet.

15. A process as defined in either of claim 13 or 14 including weaving, knitting or laying up the material into a three-dimensional article of manufacture.

16. A process as defined in claim 1 including the step of chopping the yarns produced by the process into shortened lengths.

* * * * *